United States Patent [19]

Lundy

[11] Patent Number: 4,971,846
[45] Date of Patent: Nov. 20, 1990

[54] THERMOPLASTIC CYLINDER AND PROCESS FOR MANUFACTURING SAME

[75] Inventor: Brian T. Lundy, Midvale, Utah

[73] Assignee: TRE Corporation, Los Angeles, Calif.

[21] Appl. No.: 397,362

[22] Filed: Aug. 21, 1989

Related U.S. Application Data

[63] Continuation of Ser. No. 121,298, Nov. 16, 1987, abandoned.

[51] Int. Cl.⁵ .................... F16L 9/133; B23P 17/00
[52] U.S. Cl. .................... 428/35.8; 29/527.3; 92/170.1; 92/171.1; 138/145; 138/174; 138/DIG. 2; 156/173; 179/35 MS; 428/36.4; 428/902
[58] Field of Search ............. 29/527.3; 92/170, 171; 138/DIG. 1, DIG. 2, DIG. 7, 144, 173, 145, 174; 156/173; 174/35 MS; 428/36, 902, 35.8, 36.4

[56] References Cited

U.S. PATENT DOCUMENTS

| | | | |
|---|---|---|---|
| 4,214,932 | 7/1980 | Van Auken | 428/36 X |
| 4,236,386 | 12/1980 | Yates et al. | 428/36 X |
| 4,358,512 | 11/1982 | Richter | 428/902 X |
| 4,376,675 | 3/1983 | Perotta | 428/36 X |
| 4,525,228 | 6/1985 | Bowen | 156/173 X |
| 4,559,249 | 12/1985 | Arigaya et al. | 428/36 |
| 4,581,263 | 4/1986 | Lukas | 428/36 |

FOREIGN PATENT DOCUMENTS 52-1426  1/1977  Japan .................... 428/902

*Primary Examiner*—P. W. Echols
*Assistant Examiner*—Carl J. Arbes
*Attorney, Agent, or Firm*—Spensley Horn Jubas & Lubitz

[57] ABSTRACT

A fiber/thermoplastic resin matrix cylinder with a metal lining and a process for manufacturing such a cylinder using metal plasma spray and filament winding techniques are disclosed. In the manufacturing process, a molten metal plasma spray is deposited on a heated and rotating mandrel. After the metal layer has cooled, filament winding techniques are used to deposit a layer of graphite fibers and thermoplastic resin around the metal layer, after which the mandrel is removed. The metal layer remains bonded to the fiber/thermoplastic layer. The process results in a fiber/thermoplastic resin matrix cylinder of low cost, light weight, durability, and survivability.

21 Claims, 1 Drawing Sheet

THERMOPLASTIC CYLINDER AND PROCESS FOR MANUFACTURING SAME

This is a continuation of copending application Ser. No. 121,298, filed on Nov. 16, 1987, now abandoned.

BACKGROUND OF THE INVENTION

1. Field of the Invention

This invention relates to hydraulic actuators that must operate under severe conditions. More particularly, this invention relates to aircraft hydraulic actuator cylinders that must operate under harsh conditions, must have a high degree of survivability, and be light in weight.

Both fixed wing and rotary wing aircraft typically include many different types of hydraulic actuators. Such actuators operate flight control surfaces and rotor blades, extend and retract landing gear, and open and close movable panels and doors. One particular application of a hydraulic actuator is in operating the swash plate used to change the pitch of helicopter rotor blades. As a helicopter rotor rotates, the pitch of the rotor blades changes depending on the relative location where lift is required. The pitch of a rotor blade may be characterized as the angle the blade makes with respect to the plane of rotor rotation as the blade passes through the air. For example, if an airborne helicopter is to tilt to the right, increased lift will be necessary on the left side of the helicopter. As each blade of the rotor reaches the left side of the helicopter, the pitch of the blade is changed so as to create additional lift on that side. As the blade leaves the left side of the helicopter and approaches the right side, the pitch of each blade is changed so as to reduce the amount of lift created on the right side relative to the left side. Similarly, if the helicopter is to pitch forward, increased lift will be needed from the blades as they approach the tail of the helicopter and less lift is required at the nose of the helicopter. Thus, the pitch of the helicopter blades will be changed as they leave the nose of the aircraft and approach the tail so as to increase the amount of lift created.

More complex movements of the helicopter, such as climbinq and banking simultaneously to the left or right, will require more complex combinations of changes in the pitch of the blades during a single rotation of the rotor. Obviously, the actuator controlling the pitch of each helicopter blade may be actuated several times within a single rotation of the helicopter rotor. This requires many operating cycles of the actuator during the lifetime of the helicopter, under very severe conditions. An actuator for a helicopter blade typically operates at a hydraulic pressure of 3,000 psi and an oil temperature of 275° F.

In the case of military aircraft, an additional operating requirement is a degree of survivability. Military aircraft operate in an environment in which they often are the target of small arms fire from ground troops. An aircraft is said to have survivability when it has the ability to absorb such ground fire without the loss of flight-critical systems and still return to its base for repair. Survivability is a critical and highly desirable requirement for military aircraft.

2. Description of the Prior Art

Hydraulic actuators are typically constructed entirely of metal. That is, both the actuator cylinder and the piston and rod moving within the cylinder are constructed of metal. If a bullet pierces such an actuator, the actuator cylinder wall will be deformed or dented inward where the bullet enters the cylinder. A portion of the cylinder wall then interferes with the piston travel and freezes or jams the movement of the actuator at that point. Furthermore, splintering of the metal actuator cylinder can damage other systems and can also cause other moving parts to jam.

Molded plastic actuator cylinders have been investigated in the interest of reducing cost and saving weight. Plastic alone, however, will not endure the number of operating cyles required, since the actuator piston (with piston seal loads from the hydraulic operating pressure) wears away the inner surface of the plastic cylinder. The piston seals are also subjected to accelerated wear because the molded plastic cylinder does not have the stiffness of a metal cylinder. The hydraulic operating pressures on the plastic cylinder are such that, as the piston changes direction in the cylinder, the cylinder walls are forced outward momentarily. The piston seals expand with the walls, maintaining their seal. The constant expansion and contraction of the seals as the piston moves back and forth in the cylinder results in premature seal wear. The constant expansion and contraction of the walls also stresses the cylinder. A radial expansion of two to three thousandths of an inch is practically the maximum tolerable for acceptable seal life. Thus, plastic does not withstand the high stresses with low radial deflections required for long life. Plastic also can shatter when hit by ground fire.

A metal sleeve inserted into the plastic cylinder as a lining may provide increased seal life but is not a completely acceptable solution. The point of using a plastic cylinder is to save weight and cost. A metal sleeve must therefore be thin enough to make the plastic cylinder worthwhile. The metal sleeve, however, must be of such a thickness in order to be inserted into the cylinder that the problems of bending and survivability are again present. In addition, the metal sleeve is very stiff when compared with the plastic cylinder. The metal sleeve may prevent radial expansion, but will become overstressed in trying to provide a reinforcing structure for the plastic cylinder. If the metal sleeve is made thick enough to avoid overstressing, the weight and cost savings of using a plastic cylinder are decreased.

Filament winding techniques have been used for cylinders because structures made from such techniques will not bend or dent when hit by small arms fire. In such techniques, continuous high-strength fibers that are coated or impregnated with a thermoplastic epoxy resin are wound onto a mandrel, forming a composite cylinder. The fibers allow bullets to pass through cleanly without shattering the cylinder and without causing the actuator to jam or freeze. Structures made from filament winding techniques also have the required stiffness for longer seal life. Additionally, such structures can be produced at reduced cost and lighter weight when compared to metal actuator cylinders. As with plastic cylinders, however, composite cylinders alone will not provide a sufficient number of operating cycles before being worn down by the high piston and seal loads. A metal sleeve inserted into the cylinder is unacceptable due to the bending and survivability problems, as well as weight, cost, and manufacturing problems.

Other liner techniques have been tried with both molded plastic and composite cylinders. For example, metal plating techniques have been tried where a lining of electrolus nickel is plated onto the interior surface of the actuator cylinder by means of a chemical bath. Unfortunately, metal plating techniques do not achieve a good bond between the plastic or composite cylinders and the metal layer. Thus, the electrolus nickel lining does not remain bonded to the interior surface of the actuator cylinder, and typically chips off after only approximately 50,000 cycles of the actuator. A helicopter rotor blade actuator must endure many times that number of operating cycles during its lifetime, with the general requirement being upwards of three million cycles with no repair required. Therefore, there is a need for a hydraulic actuator cylinder that is durable enough to operate in a severe environment, can be produced at lower cost, is light weight, and has a high degree of survivability.

SUMMARY OF THE INVENTION

The present invention is directed to a hollow structure or cylinder with a filament wound graphite fiber and thermoplastic resin composite outer surface having a metal layer on the inner surface. The process disclosed for making such a cylinder combines metal plasma spray techniques and filament winding techniques. Such a cylinder is durable enough to operate at the high pressures and temperatures required of hydraulic actuators for the desired number of operating cycles without repair. The metal inner layer is durable, remains bonded to the composite cylinder, and will not chip off. Because of the superior bond between the metal layer and the composite cylinder, and because the metal can be applied in a thin layer, the metal layer will not be bent inward into the cylinder interior when the cylinder is struck by small arms fire.

A hydraulic actuator cylinder manufactured in accordance with the present invention results in a cylinder that is one fourth the weight of a comparable metal cylinder, can be manufactured at a lower cost than a comparable metal cylinder, and is more durable than a molded plastic cylinder. Furthermore, because there is a good bond between the composite structure and the metal layer, metal plating techniques can be used to refurbish the cylinder by restoring the metal layer to its desired thickness if it begins to wear down or is scored.

In accordance with the present invention, a hydraulic actuator cylinder is manufactured by directing a stream of molten metal or metal plasma onto a heated and rotating mandrel. The mandrel is first heated to approximately 300° F. to 400° F. and is continuously rotated. The metal plasma stream is created by feeding a solid metal wire of the desired lining composition into an electrical arc so that the wire is heated to the point of melting. A stream of air is used to accelerate the melted wire toward the mandrel. This is commonly referred to as a "metal spray" technique and has been used in the repair of metal structures such as drive shafts, wherein a layer of metal is deposited on the outer surface of the drive shaft until the desired thickness is built up. In the metal spray technique, the temperature of the metal plasma spray created is typically between 7000° F. and 8000° F. The mandrel is of the same general size and shape of the desired cylinder. In the case of a typical helicopter blade actuator, the cylinder is approximately 10 inches long and 2 inches in diameter. The techniques presented can also be used to produce cylinders of much larger dimensions.

The metal plasma spray is directed at the mandrel until the desired metal thickness is obtained, generally on the order of twenty thousandths of an inch. After completion of the spraying and after cooling of the metal layer, the resulting surface may be cleaned with a solvent such as methyl ethyl ketone. High strength fibers such as continuous graphite fibers impregnated with thermoplastic resin are then wound onto the mandrel using filament winding techniques. During the winding process, the mandrel is heated once again, this time to 750° F. to 800° F., so that the thermoplastic resin melts and forms a composite thermoplastic/fiber matrix surrounding the metal layer. After completion of the winding and cooling of the mandrel, the mandrel is removed and the part is finished.

BRIEF DESCRIPTION OF THE DRAWINGS

The present invention will be described with reference to the appended drawings wherein.

DETAILED DESCRIPTION OF THE DRAWINGS

Figure 1:
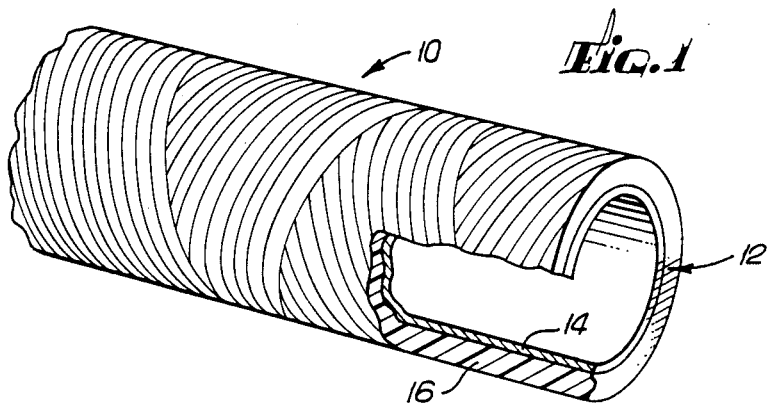
FIG. 1 is a cutaway perspective view of a preferred embodiment of an actuator cylinder manufactured in accordance with the present invention.

The following description is of the best presently contemplated mode of carrying out the invention. This description is made for the purpose of illustrating the general principles of the invention and is not to be taken in a limiting sense. The scope of the invention is best determined by reference to the appended claims and equivalents thereof. In the drawings, like reference numerals refer to like elements.

FIG. 1 shows a hydraulic actuator cylinder 10 constructed in accordance with the present invention A portion of the cylinder has been cut away, showing that the cylinder wall 12 is comprised of an inner surface 14 formed from a molten metal plasma spray and a composite outer surface 16 consisting of a matrix of filament wound graphite fibers and thermoplastic epoxy resin. Preferably, the metal plasma spray that forms the inner surface 14 is comprised of a molten aluminum bronze alloy, but other alloys, including nickel, can also be used.

Figure 2:
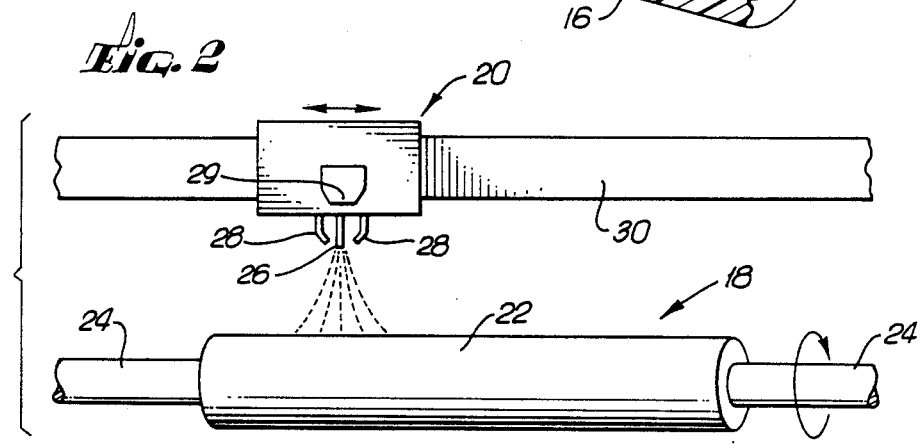
FIG. 2 is a plan view of a depiction of a mandrel with the metal plasma spray being applied.

FIG. 2 shows a mandrel 18 that is used to produce the cylinder and a spray head 20 from which a metal plasma stream is directed toward the mandrel 18. The spray head itself is not novel and similar structures are currently used in building up metal structures, such as the repair of drive shafts and the like. The mandrel 18 includes a cylindrical shaped center portion 22 supported on both ends by support rods 24. The mandrel is heated by means of an electrical heating element (not illustrated) located inside the cylindrical portion 22. The mandrel is cooled by turning off the electrical heating element and allowing residual heat to dissipate. Alternatively, the support rods and center portion may include internal passageways which may be used for circulating heated and cooled fluids within the mandrel 18, or some other means for controlling the temperature of the center portion 22 may be used. A wide range of temperatures is necessary during the manufacturing process, as the center portion of the mandrel must be heated to approximately 300° F. prior to the metal plasma spray process, and afterwards must be heated to approximately 750° F. in order to melt the thermoplastic material with which the graphite fibers are impregnated.

The spray head 20 includes a wire 26 that is formed of an aluminum bronze alloy or other composition that is desired for the cylinder lining. The end of the wire is continuously fed between two carbon rods 28 that act as electrodes, across which is generated a carbon arc. When the carbon arc is created, the temperature between the electrodes rises to approximately between 7000° F. and 8000° F., a temperature sufficient to melt the end of the wire. An air stream of high velocity and pressure (60-100 psi) is provided across the arc from a nozzle 29 so that drops of the melting wire become airborne and are carried to the surface of the mandrel. The spray head 20 is mounted on a carriage that travels back and forth on a track 30 that extends along the length of the mandrel as the mandrel is rotated. Thus, the metal spray is directed evenly over the entire surface of the mandrel.

Once the metal plasma spray application has been completed and the metal layer has cooled to a temperature acceptable for handling, the metal layer is cleaned with a solvent such as methyl ethyl ketone. This helps in the formation of a strong bond between the metal layer and the fiber/thermoplastic matrix described below. The metal layer may be cooled by simply removing the source of heat applied to the mandrel and letting the residual heat dissipate or the metal layer may additionally be cooled by directing cooled air or fluid at the metal layer and/or within the mandrel.

Figure 3:
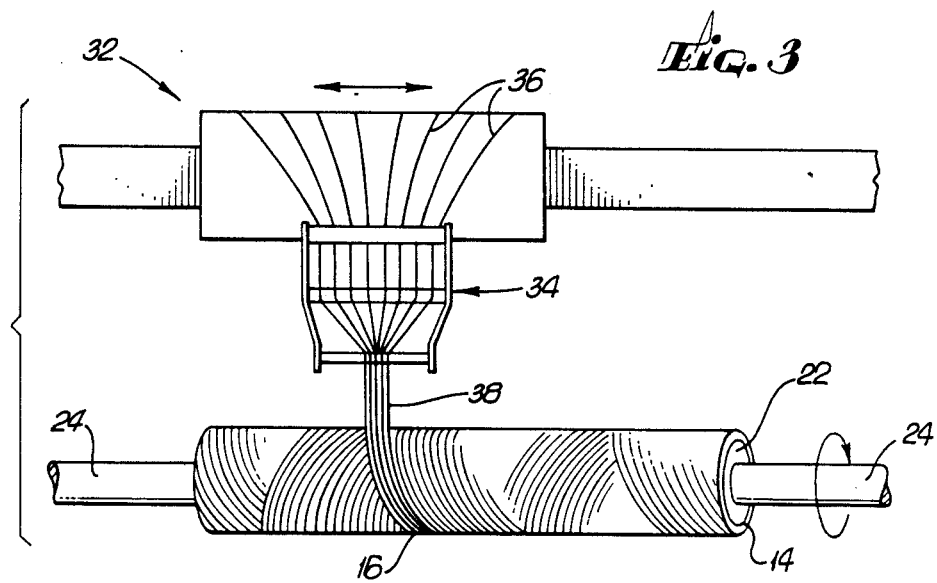
FIG. 3 illustrates the filament winding technique being applied to the mandrel after completion of the metal spray process.

FIG. 3 shows a detail of the manufacturing process following the metal plasma spray application. A filament head 32 lays down a plurality of continuous graphite fibers or threads onto the mandrel surface 22. Other high strength fibers may also be used. The graphite fibers are impregnated or covered by a layer of thermoplastic resin. The filament head 32 includes a fiber guide 34 that combines individual fiber threads 36 into a single multi-strand thread 38 that is laid down upon the mandrel. The filament head 32 is carriage-mounted so that it may move back and forth along the longitudinal axis of the mandrel and thereby lay down the graphite fibers across the entire mandrel surface in a generally helical and circumferential pattern. The filament head 32 includes a plurality of graphite fiber spools (not illustrated) from which the individual threads 36 are fed through the fiber guide 34 to the mandrel 22. The mandrel is heated to a temperature of about 750° F., a temperature that is sufficient to melt the thermoplastic resin material surrounding the fibers. The fibers are laid down on the mandrel, heat being transferred from the mandrel to the metal layer and to the fibers, thereby melting the thermoplastic resin and forming a cylinder with a graphite fiber/thermoplastic resin matrix. After the fibers have been laid down, the heat source is removed.

After the surface of the resulting cylinder has cooled, it is removed from the mandrel 22. The resulting cylinder is trimmed to the desired dimensions and is finished to produce a smooth, rounded surface. The resulting inner surface formed by the metal plasma spray process is thin enough and bonds so well to the graphite fiber/thermoplastic resin matrix that, when the cylinder is pierced by a bullet, the bullet passes cleanly through the fibers and the metal layer. There is no deformation of the metal layer that might interfere with piston travel. The bond between the inner surface and outer matrix is so good that metal plating techniques may be used to repair the inner surface.

What is claimed is:

1. A process for manufacturing a hollow thermoplastic structure with an inner metal layer comprising the steps of:
   (a) providing a mandrel;
   (b) providing a molten metal spray and directing it onto the surface of the mandrel to form a layer of metal covering the mandrel;
   (c) depositing high strength fibers and thermoplastic resin on top of the metal layer so as to form a structure having a matrix of fibers and resin surrounding the metal layer; and
   (d) separating the resulting structure from the mandrel.

2. The process of claim 1 wherein the molten metal spray is created by placing the end of a wire in an electrical arc, thereby melting the end of the wire, continuously providing additional wire into the electrical arc as the wire melts, and directing an air stream at the melting wire and toward the mandrel.

3. The process of claim 1 wherein the molten metal spray is directed onto the surface of the mandrel by directing a high velocity, high pressure stream of air over molten metal so that the molten metal becomes airborne and directing the high velocity, high pressure stream of air at the surface of the mandrel.

4. The process of claim 3 wherein the stream of air has a pressure of 60 to 100 psi.

5. The process of claim 1 wherein the mandrel is heated to a temperature of approximately 400° F. prior to providing the molten metal spray.

6. The process of claim 1 wherein the molten metal spray is directed at the surface of the mandrel until the layer of metal is approximately twenty thousandths of an inch thick.

7. The process of claim 1 wherein the mandrel and metal layer are heated to a temperature sufficient to melt a thermoplastic resin prior to the step of depositing graphite fibers and thermoplastic resin.

8. The process of claim 1 wherein continuous high strength fibers are wound onto the metal layer in a helical and circumferential pattern.

9. The process of claim 1 wherein cleaning solvents are applied to the metal layer before the step of depositing graphite fibers and thermoplastic resin on top of the metal layer.

10. A process for manufacturing a hollow thermoplastic structure with an inner metal layer comprising the steps of:
    (a) providing a mandrel;
    (b) rotating and applying heat to the mandrel;
    (c) directing a molten metal spray at the surface of the rotating and heated mandrel, the metal spray forming a layer of metal covering the mandrel;
    (d) allowing the metal layer to solidify;
    (e) maintaining the mandrel and metal layer at a temperature sufficient to melt a thermoplastic resin;
    (f) depositing high strength fibers impregnated with a thermoplastic resin on top of the heated metal layer, thereby melting the resin;
    (g) allowing the thermoplastic resin to solidify, thereby forming a matrix layer of fibers and resin surrounding the metal layer; and
    (h) removing the mandrel.

11. The process of claim 10 wherein the molten metal spray is created by placing a wire in an electrical arc, thereby melting the wire, and directing an air stream at the melting wire and in the direction of the mandrel such that the air stream carries the molten wire to the mandrel.

12. The process of claim 10 wherein the molten metal spray is directed at the surface of the mandrel until the layer of metal is twenty thousandths of an inch thick.

13. A process for manufacturing a hollow thermoplastic structure with an inner metal layer comprising the steps of:
   (a) providing a mandrel;
   (b) rotating and applying heat to the mandrel until the mandrel surface temperature is approximately 400° Fahrenheit;
   (c) providing a wire of the composition desired for the inner metal layer;
   (d) heating the end of the wire to its melting temperature and providing additional wire as the end melts;
   (e) directing a high velocity and high pressure stream of air at the melting end of the wire toward the surface of the rotating and heated mandrel, thereby forming a metal spray, until a metal layer of the desired thickness is deposited on the mandrel;
   (g) removing the source of heat applied to the mandrel and allowing the metal layer to cool down to a temperature suitable for application of cleaning solvents;
   (h) applying cleaning solvents to the metal layer;
   (i) applying heat to the mandrel and metal layer to maintain the temperature of the metal layer at a temperature sufficient to melt a thermoplastic resin;
   (j) depositing continuous high strength fibers impregnated with a thermoplastic resin on top of the heated metal layer in a helical and circumferential pattern, thereby melting the resin;
   (k) removing the source of heat applied to the mandrel and metal layer and allowing the mandrel and metal layer to cool down to a temperature sufficient to solidify the thermoplastic resin, thereby forming a matrix layer of fibers and resin surrounding the metal layer; and
   (l) removing the mandrel and surface finishing the resulting hollow thermoplastic structure with inner metal layer.

14. The process of claim 13 wherein the end of the wire is melted by placing it into an electrical arc, and additional wire is provided by continuously feeding wire into the electrical arc.

15. The process of claim 13 wherein the metal spray is directed at the mandrel until a layer of metal approximately twenty thousandths of an inch thick is deposited on the mandrel.

16. A cylinder having an outer layer of a fiber thermoplastic resin matrix and an innermost layer of metal directly contacting the outer layer, the innermost layer of metal being of a thickness that is capable of avoiding bending or splintering upon piercing of the cylinder by small arms fire.

17. The cylinder of claim 16 wherein the thickness of the innermost layer of metal is twenty thousandths of one inch.

18. A hollow cylinder comprising a thin metal spray cylinder interior layer formed by metal spraying, the metal layer forming the innermost surface of the cylinder, and a fiber and thermoplastic resin matrix surrounding and directly contacting the metal layer.

19. The cylinder of claim 18 wherein the fiber and thermoplastic resin matrix is bonded to the metal interior layer by melting a thermoplastic resin around the metal spray cylinder.

20. An actuator cylinder for use with a piston reciprocating within the cylinder, the cylinder having a thin metal innermost layer against which the piston reciprocates and an outer layer comprised of a matrix of fibers and thermoplastic resin, the innermost layer and outer layer being in direct contact and securely bonded together and the innermost layer being of a thickness that is capable of avoiding bending or splintering upon piercing of the actuator cylinder by small arms fire.

21. The actuator cylinder of claim 20 wherein the thickness of the metal innermost layer is twenty thousandths of one inch.

* * * * *